Figure 1:
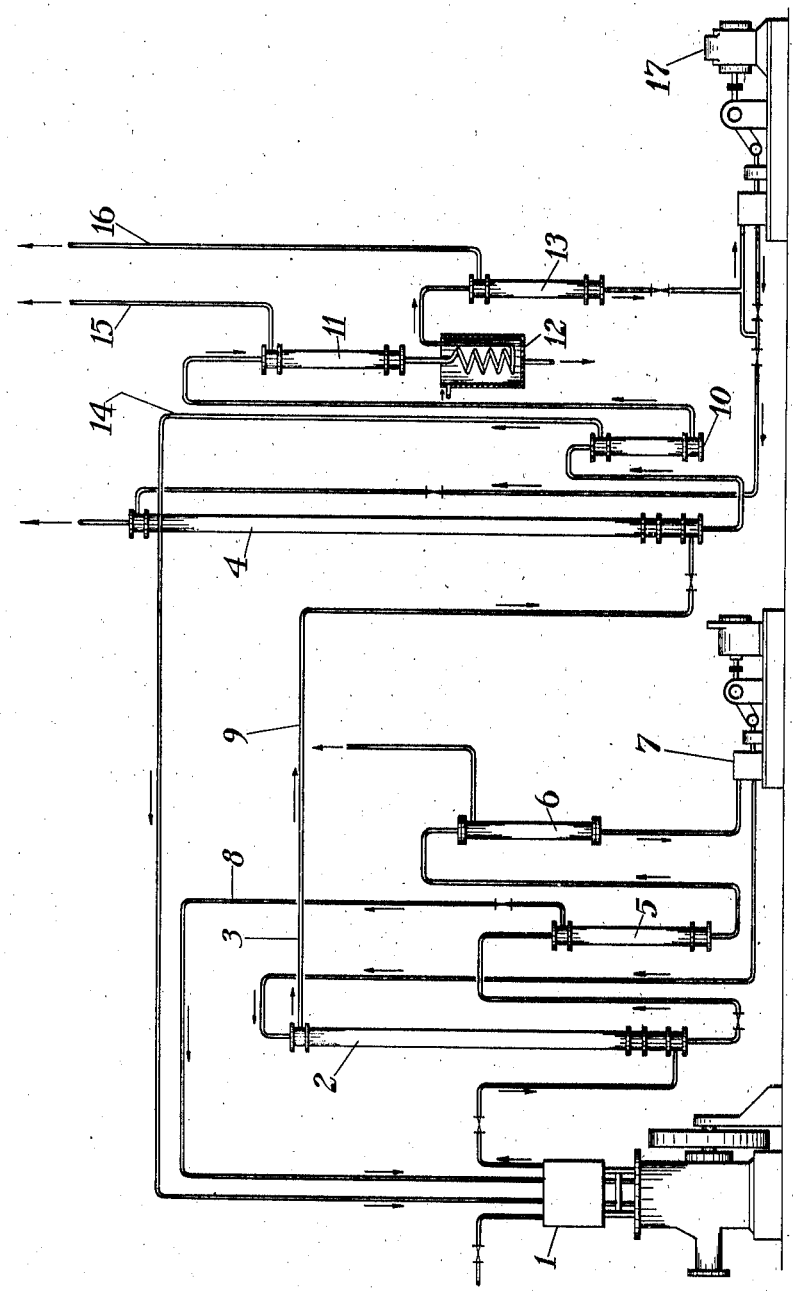

Oct. 23, 1934.      H. G. WATTS      1,977,659
PROCESS OF RECOVERING ETHYLENE FROM GASEOUS
OLEFINE MIXTURES CONTAINING THE SAME
Filed Nov. 29, 1932      2 Sheets-Sheet 1

INVENTOR.
Harold Garfit Watts
BY
Charles F. Daley
ATTORNEY.

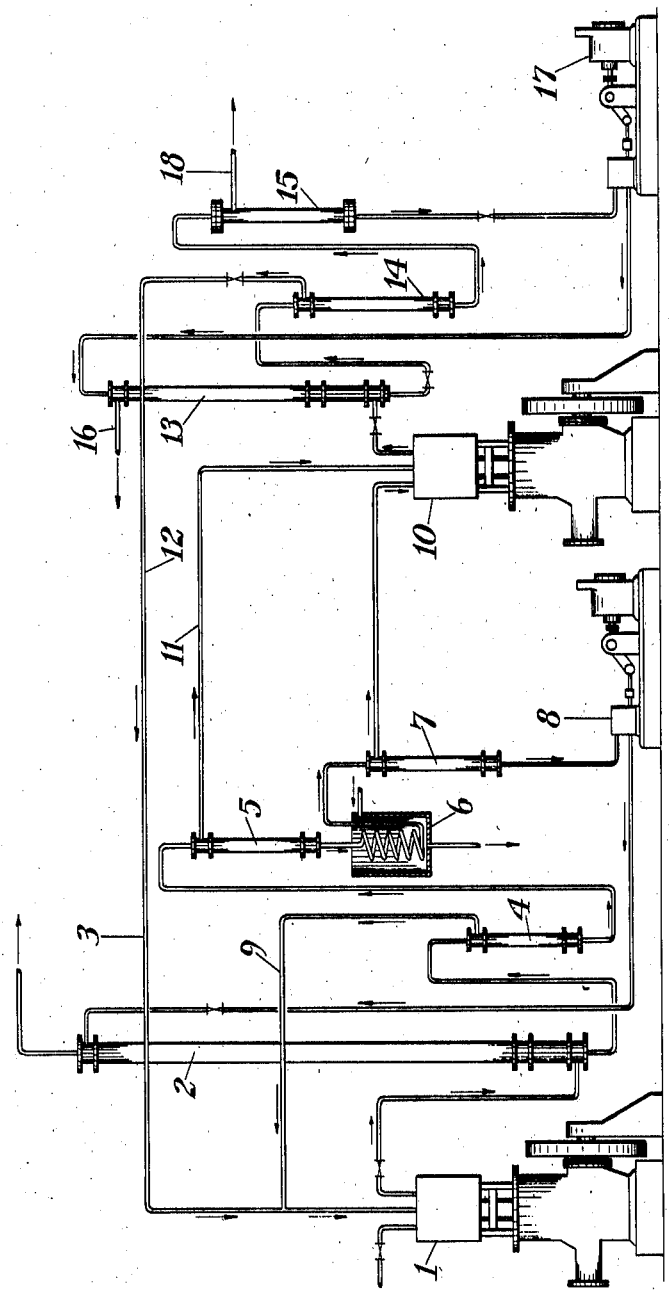

Patented Oct. 23, 1934

1,977,659

UNITED STATES PATENT OFFICE 1,977,659

PROCESS OF RECOVERING ETHYLENE FROM GASEOUS OLEFINE MIXTURES CONTAINING THE SAME

Harold Garfit Watts, Norton-on-Tees, England, assignor to Imperial Chemical Industries Limited, a corporation of Great Britain Application November 29, 1932, Serial No. 644,801
In Great Britain December 2, 1931

21 Claims. (Cl. 260—170)

This invention relates to the separation of ethylene from its homologues, and particularly to the separation of ethylene from industrial gases rich in ethylene and containing also other olefines.

I have now found that when gases rich in olefines such as oil cracking gas, or gases obtained by the pyrolysis of gaseous hydrocarbons such as methane and ethane, are washed with ammoniacal cuprous salt solutions either at ordinary or superatmospheric pressure, the gas recovered from the solution by heating and/or reduction of pressure contains an increased proportion of ethylene. The solubility coefficients of ethylene, propylene and butylene in ammoniacal cuprous salt solutions have been found to be of the order of 3.0, 0.7 and 0.2 cubic metres of gas per cubic metre of liquor respectively at atmospheric pressure.

According to the present invention, therefore, ethylene is separated from its homologues by washing a gas mixture rich in ethylene and containing also propylene, with or without other olefines, with an ammoniacal cuprous salt solution, preferably under superatmospheric pressure, e. g. 15-20 atmospheres, separating the solution from the residual gases and regenerating the dissolved ethylene by heating and/or reduction of pressure.

When the absorption is carried out at superatmospheric pressure, the release of pressure on the used absorbent is preferebaly carried out in two or more stages. The gas obtained in the early stages contains a higher proportion of propylene than the gas remaining in solution and may be returned to the process by introducing it at a suitable stage to the compressors. A further concentration of ethylene in the gas finally recovered is thus effected.

The above described process does not, however, effect a sharp separation of the ethylene and propylene, and it is therefore desirable to treat the gas, either before or after the washing with ammoniacal cuprous salt solution, with a preferential solvent for propylene. Accordingly preferred modifications of my invention relate to such additional treatments of the gas mixture either before or after the main process as hereinbefore described.

Thus, for instance, in one modification, the amount of propylene dissolved by the cuprous solution and recovered with the enriched ethylene is still further reduced by giving the initial gas mixture a preliminary treatment with a preferential solvent for propylene. A suitable solvent is kerosene, in which propylene is approximately five times as soluble as ethylene.

In another modification, the enriched ethylene recovered from the ammoniacal cuprous salt solution is treated with a solvent such as kerosene to dissolve out any residual propylene. If desired both the preliminary and final treatments with kerosene may be employed, but in general I have found that such a three-stage process is an unnecessary refinement and that treatment with an ammoniacal cuprous solution, either preceded or followed by a treatment of kerosene, gives a gas consisting of ethylene of a satisfactory degree of purity.

Practical embodiments of the two modifications mentioned above are described with reference to the accompanying drawings, in which Figs. 1 and 2 are diagrammatic flow-sheets.

Referring to Fig. 1, a crude oil cracking gas is fed to a compressor 1 and the compressed gas is washed in a tower 2 with a counter-current stream of kerosene. The exit gases from the tower 2 pass by the pipe line 3 to another tower 4 in which they are washed with a counter-current stream of ammoniacal cuprous salt solution. The kerosene, holding in solution the majority of the propylene contained in the initial gases together with some of the ethylene, is circulated through two let-down vessels 5 and 6 by means of a pump 7, from which it is passed back to the top of the scrubbing tower 2. In the let-down vessels the pressure on the kerosene is reduced in stages and the gases evolved are collected separately. The first fraction, which contains relatively more ethylene, is passed by the pipe line 8 back to a suitable stage of the compressor 1 and admixed with fresh crude gases. The second fraction, which contains relatively more propylene, is withdrawn separately and if desired is used as a source of propylene compounds. A similar two-stage let down system is employed for the ammoniacal cuprous salt solution employed to wash the gases in the tower 4. The solution coming from the base of the tower, containing the majority of the ethylene and some of the residual propylene that escaped absorption in the kerosene, is passed through two let-down vessels 10 and 11 in which the pressure is reduced in stages, and then through a steam heater 12 to a regenerating vessel 13. The gas evolved from the first stage let-down contains a relatively high proportion of propylene and is passed by the pipe line 14 back to a suitable stage of the compressor 1. The gases from the second stage let-down and from the regenerating vessel are withdrawn at 15 and 16 respectively, and together constitute the enriched ethylene obtained as a final product of the process.

The following results are illustrative of the practical operation of the above-described process. Cracking still gases were washed at atmospheric temperature in counter-current with 60 litres/hour of kerosene, boiling between 200 and 300° C., in an unpacked tower 2" in diameter and 12' high having an effective washing surface of 6.3 sq. ft. The exit gases, were then washed with 240 litres/hour of ammoniacal cuprous solution in an unpacked tower 2" in diameter and 50' high having an effective washing surface of 25.2 sq. ft. The pressure of the gases in each scrubbing tower was 17 atmospheres and the first stage let-down pressures for the kerosene and cuprous solutions were respectively 7 atmospheres and 3.5 atmospheres.

The ammoniacal cuprous solution employed had the following composition:—

| | |
|---|---|
| Total copper | 1.7 gm. mols./litre |
| Cuprous copper | 1.3 gm. mols./litre |
| Ammonia | 7.0 gm. mols./litre |
| Formic acid | 2.3 gm. mols./litre |
| $CO_2$ | 1.3 gm. mols./litre |

Under these conditions the following analyses were obtained. The gas volumes are reckoned at normal temperature and pressure.

| Gas | Ethylene | Propylene | Butylene | Methane | Ethane and higher saturated hydrocarbons | Hydrogen and inert gas |
|---|---|---|---|---|---|---|
| | Per cent | Per cent | Per cent | Per cent | Per cent | Per cent |
| Oil cracking gas 7620 litres/hour | 24.4 | 12.8 | 4.0 | 32.0 | 20.4 | 6.3 |
| Kerosene 1st stage let down 1000 litres/hour | 36.4 | 19.4 | 4.2 | 16.4 | 22.4 | 1.2 |
| Copper liquor 1st stage let down 380 litres/hour | 43.6 | 4.8 | 1.6 | 22.6 | 24.2 | 3.2 |
| Total gas admitted to kerosene tower 9000 litres/hour | 26.5 | 13.2 | 3.9 | 29.9 | 20.8 | 5.7 |
| Kerosene 2nd stage let down 2180 litres/hour | 17.6 | 40.1 | 13.1 | 1.7 | 27.2 | .3 |
| Gas leaving kerosene tower and passing to copper liquor tower 5820 litres/hour | 28.2 | 2.0 | 0.4 | 42.8 | 18.1 | 8.5 |
| Gas leaving copper liquor tower 4060 litres/hour | 4.3 | 2.0 | 0.3 | 59.1 | 22.9 | 11.4 |
| 2nd stage copper liquor let down 1380 litres/hour | 94.6 | 2.0 | 0.5 | ------ | 2.4 | 1.2 |

Another modification of the invention consists, as hereinbefore mentioned, in treating the enriched ethylene recovered from the ammoniacal cuprous salt solution with a solvent such as kerosene, to dissolve out any residual propylene. Referring to Fig. 2, crude oil cracking gas is fed to a compressor 1 and the compressed gas is washed in a tower 2 with a counter-current stream of ammoniacal cuprous solution and the exit gases are allowed to escape to waste. The solution, holding in solution the majority of the ethylene contained in the initial gas together with some of the propylene and higher olefines, is circulated through two let-down vessels 4 and 5, a steam heater 6 and a regenerating vessel 7 by means of a pump 8. In the let-down vessels the pressure on the cuprous solution is reduced in stages and the gas evolved from the first stage containing a relatively higher proportion of propylene is returned by the pipe-line 9 to the compressor 1, while the gas evolved from the 2nd stage containing a high proportion of ethylene is passed by the pipe-line 11 to a compressor 10 where, together with the similar gases evolved from the regenerating vessel 7, it is compressed and admitted to the base of the tower 13. In this tower the gases are subjected to washing with a counter-current stream of kerosene which dissolves out the residual propylene, leaving a highly concentrated ethylene gas which is withdrawn from the top of the tower at 16. If desired, the kerosene may be circulated by the pump 17 through two let-down vessels 14 and 15 in which the pressure is reduced in stages, the first stage let-down gas being recirculated to the compressor 1.

The following results are illustrative of the practical operation of the above-described process. Cracking still gases were washed at atmospheric temperature in counter-current with 370 litres/hours of ammoniacal cuprous solution in the same tower as employed for the previous modification, at a pressure of 17 atmospheres. The pressure on the cuprous solution was reduced in stages to four atmospheres and to atmospheric pressure and the solution subsequently heated in order to complete the regeneration of the dissolved ethylene gases, and the second stage let-down gases, together with those regenerated on heating, were then compressed to 17 atmospheres and washed with 15 litres/hour of kerosene boiling between 200 and 300° C. A tower 1" in diameter and 12' high having an effective surface of 3 sq. ft. was employed for this washing. The pressure on the kerosene was reduced in stages to 4 atmospheres and to atmospheric pressure, and the first stage let-down gas recirculated to the initial compressor, the second stage let-down gas being rejected.

Under these conditions the following analyses were obtained, the gas volumes being reckoned at normal temperature and pressure.

| Gas | Ethylene | Propylene | Butylene | Methane | Ethane and higher saturated hydrocarbons | Hydrogen and inert gas |
|---|---|---|---|---|---|---|
| | Per cent | Per cent | Per cent | Per cent | Per cent | Per cent |
| Oil cracking gas 7750 litres/hour | 24.4 | 12.8 | 4.0 | 32.0 | 19.4 | 6.4 |
| Copper liquor 1st stage let down 805 litres/hour | 34.6 | 23.8 | 8.5 | 10.8 | 19.2 | 23.8 |
| Kerosene 1st stage let down 445 litres/hour | 75.0 | 12.5 | 8.3 | ------ | 2.8 | 1.4 |
| Total gas admitted to copper liquor tower 9000 litres/hour | 27.8 | 13.8 | 4.6 | 28.6 | 19.5 | 8.9 |
| Copper liquor exit gas 5680 litres/hour | 4.6 | 14.9 | 3.8 | 42.2 | 26.3 | 8.2 |
| Copper liquor 2nd stage let down gas passed to kerosene tower 2315 litres/hour | 84.5 | 7.2 | 5.4 | ------ | 2.1 | .8 |
| Kerosene exit gas 1460 litres/hour | 96.6 | 1.3 | ------ | ------ | 1.7 | .4 |
| Kerosene 2nd stage let down 410 litres/hour | 50.8 | 23.1 | 21.6 | ------ | 3.0 | 1.5 |

Of the two above described modifications of this invention, the former comprising pretreatment with kerosene has an advantage over the latter, comprising after-treatment, in that it enables a quantity of gas to be recovered from solution in the kerosene containing a relatively high proportion of propylene. On the other hand, in the latter modification a slightly greater quantity of ethylene gas is recovered having a higher ethylene concentration.

The kerosene referred to above is a mineral oil fraction approximating ordinary kerosene and substantially all of which oil boils over 200° C. at atmospheric pressure (see copending Horsley U. S. application Serial No. 637,557 filed October 12, 1932). Other preferential solvents for propylene and the higher olefines may of course be used instead of kerosene.

While the ammoniacal cuprous salt solution described is ammoniacal cuprous formate solution, ammoniacal cuprous salt solutions in general, such as ammoniacal cuprous lactate, ammoniacal cuprous propionate, and ammoniacal cuprous chloride, may be used.

I claim:

1. The process for the separation of ethylene from its homologues, which comprises washing a gas mixture containing substantial amounts of ethylene and higher gaseous olefines, with an ammoniacal cuprous salt solution, separating the solution from the residual gases and regenerating the dissolved ethylene.

2. The process described in claim 1 in which the washing is effected under superatmospheric pressure.

3. The process described in claim 1 in which, prior to washing with ammoniacal cuprous salt solution, the gas mixture is washed with a preferential solvent for propylene.

4. The process described in claim 1 in which, prior to washing with ammoniacal cuprous salt solution, the gas mixture is washed with kerosene.

5. The process described in claim 1 in which, prior to washing with ammoniacal cuprous salt solution, the gas mixture is washed with a preferential solvent for propylene under superatmospheric pressure.

6. The process described in claim 1 in which the washing is effected under superatmospheric pressure, and the gases are regenerated from solution by reducing the pressure in stages.

7. The process described in claim 1 in which the washing is effected under superatmospheric pressure, and the gases are regenerated from solution by reducing the pressure in stages, the gases evolved in the first stage being recompressed and again passed through the process.

8. The process for the separation of ethylene from its homologues, which comprises washing a gas mixture containing substantial amounts of ethylene and higher gaseous olefines, with an ammoniacal cuprous salt solution, separating the solution from the residual gases and regenerating the dissolved ethylene by heating the solution.

9. The process for the separation of ethylene from its homologues, which comprises washing a gas mixture containing substantial amounts of ethylene and higher gaseous olefines, with an ammoniacal cuprous salt solution, separating the solution from the residual gases and regenerating the dissolved ethylene by reducing the pressure of the solution.

10. The process for the separation of ethylene from its homologues, which comprises washing a gas mixture containing substantial amounts of ethylene and higher gaseous olefines, with an ammoniacal cuprous salt solution, separating the solution from the residual gases, regenerating the dissolved ethylene, then washing the regenerated gases with a preferential solvent for propylene.

11. The process for the separation of ethylene from its homologues, which comprises washing a gas mixture containing substantial amounts of ethylene and higher gaseous olefines, with an ammoniacal cuprous salt solution, separating the solution from the residual gases, regenerating the dissolved ethylene, then washing the regenerated gases with kerosene.

12. A process for the separation of ethylene from its homologues, which comprises washing a gas mixture rich in ethylene and containing at least one other olefine, with an ammoniacal cuprous salt solution, separating the used solution from the undissolved gases, and regenerating the dissolved ethylene from the said used solution.

13. A process as set forth in claim 12, in which the washing is effected under increased pressure.

14. A process as set forth in claim 12, in which the washing is effected under a pressure of the order of 20 atmospheres.

15. A process for the separation of ethylene from propylene, which comprises washing a gas mixture rich in ethylene and containing also propylene, with a preferential solvent for propylene, whereby the gas is enriched in ethylene at the expence of the propylene, washing the enriched gas with an ammoniacal cuprous salt solution, separating the used cuprous solution from the undissolved gases, and regenerating the dissolved ethylene from the said used cuprous solution.

16. A process for the separation of ethylene from propylene, which comprises washing a gas mixture rich in ethylene and containing also propylene, with a mineral oil fraction substantially all of which boils over 200° C., said washing being effected under a pressure of the order of 20 atmospheres, whereby the gas mixture is enriched in ethylene at the expense of the propylene, washing the enriched gas with an ammoniacal cuprous salt solution, under substantially the same pressure as used in the preceding washing, separating the used cuprous solution from the undissolved gases, and regenerating the dissolved ethylene from the said used cuprous solution.

17. In a process as set forth in claim 16, regenerating the dissolved ethylene from the used cuprous solution by reducing the pressure in stages and collecting separately the gases evolved in each stage.

18. A process for the separation of ethylene from propylene, which comprises washing a gas mixture rich in ethylene and containing also propylene, with an ammoniacal cuprous salt solution, under a pressure of the order of 20 atmospheres, separating the used cuprous solution from the undissolved gases, regenerating the dissolved gases from the said used cuprous solution by reduction of pressure and heating, compressing the regenerated gases, and washing them under pressure with a mineral oil fraction substantially all of which boils over 200° C., whereby the gas mixture is enriched in ethylene at the expense of the propylene.

19. In a process as set forth in claim 18, regenerating the dissolved gases from the used cuprous solution by reducing the pressure thereof in stages, collecting separately the gases evolved in each stage, compressing the gases evolved in the first stage, joining them with the gases to be washed with the cuprous solution and separately compressing the gases evolved in the second stage of pressure reduction, prior to washing with the said mineral oil fraction.

20. A process for the separation of ethylene from propylene, which comprises compressing a gas mixture rich in ethylene and containing also propylene, washing the compressed gas with a preferential solvent, for propylene separating the used solvent from the undissolved gases, reducing the pressure on said used solvent in stages, collecting separately the gases evolved in each stage, recompressing the gases evolved in the first stage and joining them with the gas mixture to be washed with the said solvent, washing said undissolved gases with an ammoniacal cuprous salt solution, separating the used solution and the undissolved gases, regenerating the dissolved gases from the said used solution by reducing the pressure thereof in stages, collecting separately the gases evolved in each stage, recompressing the gases evolved in the first stage and joining them with the gas mixture to be washed with the preferential solvent for propylene.

21. A process for the separation of ethylene from propylene, which comprises compressing a gas mixture rich in ethylene and containing also propylene, washing the compressed gas with an ammoniacal cuprous salt solution, separating the used solution from the undissolved gases, regenerating the dissolved gases from the said used solution by reducing the pressure thereof in stages, collecting separately the gases evolved in each stage, recompressing the gases evolved in the first stage and joining them with the gas mixture to be washed with the said cuprous solution, separately compressing the gases evolved from said used solution in the second stage pressure reduction, washing recompressed gases with a preferential solvent for propylene, separating the used solvent from the undissolved gases, regenerating the dissolved gases from said used solvent by reducing the pressure thereof in stages, collecting separately the gases evolved in each stage, recompressing the gases evolved in the first stage and joining them with the gas mixture to be washed with the same said cuprous solution.

HAROLD GARFIT WATTS.